May 21, 1968

W. FLATT 3,384,421

CONDUIT SHUNTING DEVICE

Filed Aug. 2, 1966

INVENTOR.
WERNER FLATT
BY
attorneys

May 21, 1968   W. FLATT   3,384,421
CONDUIT SHUNTING DEVICE

Filed Aug. 2, 1966   3 Sheets-Sheet 2

INVENTOR.
WERNER FLATT
BY *(signature)*
attorneys

United States Patent Office 3,384,421
Patented May 21, 1968

3,384,421
CONDUIT SHUNTING DEVICE
Werner Flatt, Uzwil, Switzerland, assignor to Gebruder Buhler AG, Uzwil, Switzerland
Filed Aug. 2, 1966, Ser. No. 569,732
Claims priority, application Switzerland, Aug. 6, 1965, 11,115/65
5 Claims. (Cl. 302—28)

ABSTRACT OF THE DISCLOSURE

A conduit shunting device includes a housing formed with a main conduit connection and two branch conduit connections. The branch conduits are arranged at an acute angle to each other and the housing includes a gusset formation between the branch conduits defining an elongated slot extending inwardly from an opening defined between the two branched conduits. The slot accommodates a stop valve member which defines a seal for the slot and an inner bearing, sealing and supporting the inner end of a movable flap which controls flow from the main conduit to one or the other of the branched conduits. A feature of the construction is that the stop valve member with the flap valve may be removed through the slot of the gusset and it may be easily replaced therein and sealed and supported by the gusset in combination with cover members which rotatably engage and support pivot elements carried by the movable valve flap. The stop valve member may be tightly held in a sealing position within the slot defined in the gusset by clamping means which bear against flanges of the adjacent conduits.

Summary of the invention

This invention relates in general to conduit shunt or conduit valve construction and in particular to a new and useful conduit switching device for bulk material conveyor systems having a pivoting flap mounted in bearings in a gusset between two pipe junctions of the device on a pivot axis arranged at one flap end.

Conduit switching devices or shunts for pneumatic conveyor systems are known which have pivoting flaps which are mounted for pivotal movement about the center of the flap or about one end thereof. Difficulties are encountered in applying the packing especially on one end of the flap with the known methods of mounting of the pivoting flaps. Such problems can be partially solved by the unilateral mounting of the pivoting flaps provided the flap can be placed on the exit ends of the conduits or pipes to be connected as has been suggested heretofore. Such pipe shunts, however, have the disadvantage that they require a very considerable widening of the conveyor cross section at the location of the flap. Such conveyor cross sectional enlargements have the disadvantage that the conveyor flow conditions are changed and material accumulations may occur therein. It has been proposed to use rotatable pipe cutouts instead of pivoting flaps but the construction of rotatable elements present various packing problems.

In accordance with the present invention there is provided a novel conduit shunt construction in which a flap is pivotally mounted about its one end adjacent the gusset formation between the two divergent pipe lines of the shunt. In accordance with one feature of the invention, the gusset between the two pipe junctions is provided with a slot forming a prolongation opposite the pivotal mounting of the flap in which is inserted a stop valve member which is braced against the pivotal axis of the flap.

In accordance with one embodiment of the invention, the pivot for the flap is journalled in end plate elements which are fastened to opposite sides of the pipe housing at the location of the gusset juncture between the two pipe formations. The gusset itself is formed with a cavity or recess into which is inserted an insert or backing member which bears against a pivot of the flap element and which may be easily removed if so desired. A variation of this arrangement provides an improved means for clamping the insert member within the gusset recess and a further variation provides for a cover mounting for the pivotal flap member which permits the flap member to be located with its pivotal pin in bearing engagement with the recess formed within a fixed gusset formation. In a still further variation the divergent conduit portions in the area of the flap are made of rectangular configuration and are provided with a rectangular, preferably transparent, cover which advantageously may provide a mounting for the pivot of the flap member. The construction includes a housing in which the gusset is provided with a recess into which a removable backing or stop member may be inserted and braced against the pivot member of the flap. The construction may be such that the brace member may be moved upwardly upon removal of the cover or outwardly upon releasing of the clamping member.

Accordingly, it is an object of the invention to provide an improved flow control device particularly for the control of flow of bulk materials between interconnecting conduit elements.

A further object of the invention is to provide a shunt device for the control of the flow of material through two conduits connected together in a shunt housing which includes means for pivoting a flow control flap about its one end and for arranging the pivot so that it may be braced in respect to a stop formation which may be either fixed or movably arranged at the gusset formation between the divergent pipe sections of the housing.

A further object of the invention is to provide a shunting device for the control of the flow of bulk liquids which includes a housing having a fixed gusset formation between two divergent conduit elements and with a curved recess formed at the gusset and further with a cover member which rotatably receives a pivot pin for a control flap which may be inserted with the cover into the juncture area or between the two conduits with the pivot arranged to be braced against the recess defined in the gusset.

A further object of the invention is to provide a shunting device particularly for bulk material which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
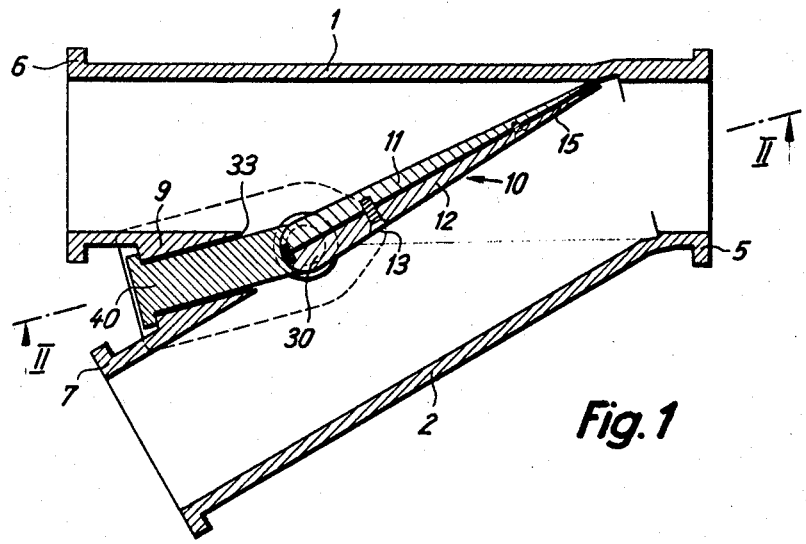
FIG. 1 is a longitudinal section through a pipe shunt constructed in accordance with the invention and taken along the line I—I of FIG. 2.

The invention embodied therein in FIG. 1 comprises a shunt or valve housing formed by a main pipe section 1 and a branch pipe section 2. The housing thus formed is provided with three flange connections and pipe end openings for connecting to further conduit lengths located at 5, 6 and 7. A gusset 9 is formed between the connecting terminals 6 and 7 and a pivoting flap generally designated 10 is pivotally mounted about a pivot disposed at its one end and located adjacent the gusset formation 9. The flap includes two cover plate portions 11 and 12 and a central packing 15 which is clamped therein by clamping screws 13.

Figure 2:
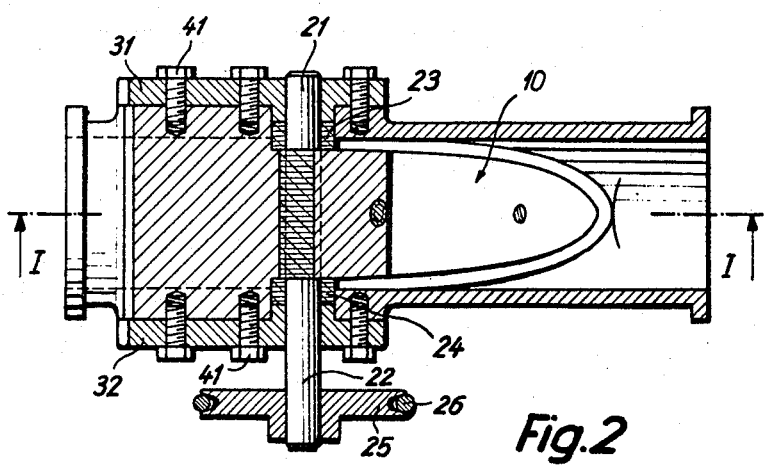
FIG. 2 is a section taken along the line II—II of FIG. 1.

In accordance with the embodiment of the invention of FIGS. 1 and 2, the flop 10 is provided with upwardly and downwardly extending journal pin portions or pivot elements 21 and 22 which are journalled in respective plates 31 and 32. The plates 31 and 32 are secured over the gusset formation 9 by bolts 41. Packings 23 and 24 are arranged between the bearing plates 31 and 32 and the pivoting flap 10. One of the journal pins, the pin 22, is elongated and it carried a disc 25 having a rope 26 trained to run around a groove therein for the purpose of controlling the operation of the flap 10.

In accordance with a feature of the invention, as indicated in the embodiments of FIGS. 1 and 2, the gusset formation 9 is provided with an elongated slot 33 in which is inserted a stop valve member or insert 40. The stop valve member 40 is braced against the curved pivotal end of the flap 10 and is braced in position by the bearing plates 31 and 32 and the screws 41.

The arrangement indicated in FIGS. 1 and 2 provides the following advantages:

Because of the long stop valve member 40 there is always a long packing portion in the zone of the mounting of the pivoted flap 10. Because the stop valve member 40 is very easily removable through the slot 33, the pivoting flap 10 also may be easily removed through the slot. This results in a substantial simplification of the maintenance of such pipe shunts in camparison to the known models.

Figure 3:
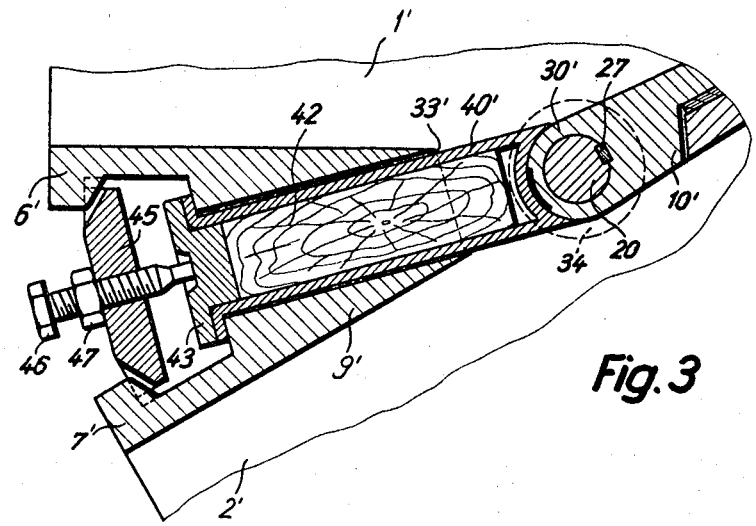
FIG. 3 is an enlarged sectional view similar to FIG. 1 of another embodiment of the invention.

In the variant indicated in FIG. 3, the main conduit 1' is connected to the branch conduit 2' in a manner to form the end terminals or connecting flanges 6' and 7' as indicated. A gusset formation 9' in this embodiment includes an elongated recess 33' as in the other embodiment. The pivoting flap 10' is cottered or keyed to the shaft 20 by the key 27. Bearings 34 are provided at each end of the housing for journalling the shaft 20. A stop member 40' which is inserted within the recess 33' is made of pressed material, and for increasing the pressure stability, a wooden block 42 is inserted within the interior thereof. The wooden block 42 is retained by a pressure plate 43. A clamping plate 45 for the securing of the stop valve 40' is engaged within the inner ends of the flanges 6' and 7' and it is threaded over a screw 46 on which is provided a lock nut 47. The screw is threaded into the clamping plate 45 until it bears tightly against the flanges and then the lock nut 47 is positioned tightly down on the clamping plate.

The embodiment of FIG. 3 provides certain advantages over that of FIGS. 1 and 2 because it is a simple matter to clamp and unclamp the insert 40 in position. The bearing axle 20 and the wedge 27 and the lateral bearing 34 may be removed outwardly from the housing to permit the pivoting flap 10' to be taken out through the slot 33' after the stop valve member 40' is first removed. Because of the adjustable clamping of the stop valve member 40' opposite the pivoting flap axis 30' a reliable packing between the two parts is possible. This results in the transfer of a minimum of infiltrated air from one conveyor channel into the other.

Figure 4:
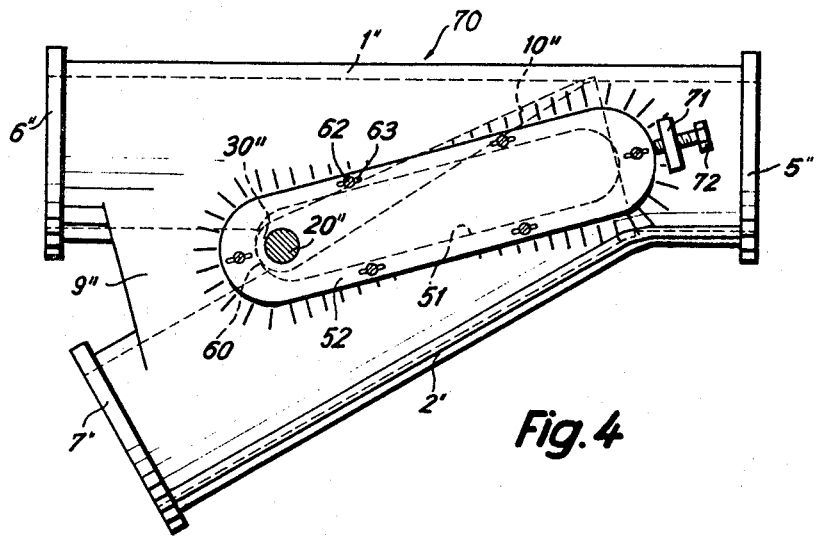
FIG. 4 is a top plan view of still another embodiment of the invention.

In the embodiment indicated in FIG. 4, the housing generally designated 70 is provided with a main conduit portion 1" and a branch conduit portion 2" with flanged connecting ends 5", 6" and 7" as indicated. In this embodiment the housing 70 is provided with an elongated slot 51 which is at least the length of the pivoting flap 10". The slot 51 is closable over cover 52 which may be made of the same material as the housing or for example of a transparent material. In the shunt housing 70 the cover 52 is designed flush with the adjacent internal surfaces.

The cover is provided with elongated slots 63 to permit adjustment of the cover in respect to securing screws 62. The adjustment is carried out by means of an adjustment nut 72 which is threaded into an upstanding projection 71 which is defined on the housing adjacent one end of the cover. In this embodiment the gusset 9" is of fixed formation and designed as a fixed part of the housing 70. The gusset is provided with a recess or curved depression 60 opposite the pivotal edge of the flap 10". The construction of FIG. 4 permits easy insertion or removal of the flap 10" through the slot 51 when the cover is removed. This also makes it possible to obtain the optimal adjustment between the pivoting flap axis 30" and the depression 60 at the gusset 9" because of the adjustment of the cover which carries journals for the bearing 20". When using a cover 52 of transparents material, there also is an additional advantage in the possibility for control of the packing, infiltrated air, material flow and position of the pivoting flap.

Figure 5:
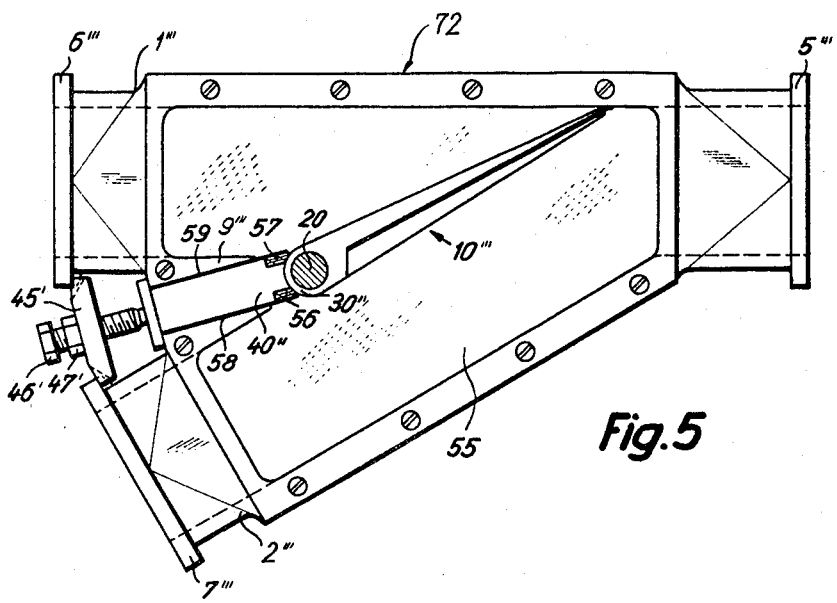
FIG. 5 is a top plan view of still a further embodiment of the invention.

In the embodiment indicated in FIG. 5, there is shown a shunt housing generally designated 72 which includes a main conduit portion 1''' and a branch portion 2'''. These two portions define end flange sections 5''', 6''' and 7''' as in the other embodiments. In this embodiment, however, the central area of the housing 72 is made of rectangular configuration to accommodate the pivoting flap member 10'''. In this variation the sides of the housing are advantageously covered with respective transparent plates 55. A stop valve member 40'' is inserted in a gusset formation 9''' similar to the other embodiments. The stop valve member 40'' also includes in this embodiment two packing strips 56 and 57 which are held laterally by springs 58 and 59. The stop valve 40'' is clampable by clamping screws 46 in the clamping plate 46' and the clamping plate 45' and secured in position by a lock nut 47 as in the embodiment of FIG. 3. Because the packing strips 56 and 57 are held by springs 58 and 59 on both sides of the stop valve, any material encrusting on the pivot flap 10''' is immediately removed by being scraped off the flap 10'''. Therefore, no dirt can be drawn in between the stop valve 40'' and the pivoting axis 30''.

Without departing from the idea of the invention, additional modifications of the pipe shunt housing would be possible, in particular, with respect to the outward design of the housing and construction of the stop valve.

While specific embodiments of the invention have been shown and described in detail to illustrate the application of the inventive principles, it will be understood that the invention may be embodied otherwise without departing from such principles.

What is claimed is:

1. A conduit shunting device comprising a housing including a main conduit portion having a flow opening, two branch conduit portions branching outwardly from said main conduit portion arranged at an acute angle to each other and each having a flow opening at its outer free end, a gusset formed between said two branch conduit portions, a pivot in said housing adjacent said gusset, a flow control flap mounted for pivotal movement in said housing on said pivot being pivotable between positions blocking flow respectively through said main conduit into respective ones of said two branch conduits, a slot of a size to permit said flap member to pass therethrough extending from the exterior to the interior of said housing, removable closure means covering said slot affixed to said housing adjacent said slot and which may be removed to permit removal of said flap member, said slot being a recess defined in said gusset extending from the exterior to the interior of said housing at the juncture of said two branch conduits, an insert extending into and closing said recess and defining a bearing extending around a portion of the end of said flap adjacent said gusset, a flange defined around the end openings of said two branch conduits on each side of said gusset, a clamping plate arranged to bear against the interior of said flanges of said two branch conduits, and a threaded member threaded into said clamping plate and arranged to bear against said insert member to clamp said insert member in the recess of said gusset.

2. A conduit shunting device comprising a housing including a main conduit portion having a flow opening, two branch conduit portions branching outwardly from said main conduit portion and arranged at an acute angle to each other and each having a flow opening at its outer free end, a gusset formed between said two branch conduit portions having an opening at its outer end and at respective opposite sides of said housing and defining a slot between said branch conduit portions, a flow control flap mounted for pivotal movement in said housing being movable between respective positions blocking flow through said main conduit into respective ones of said branch conduits, a longitudinally elongated substantially block-shaped stop valve member disposed in the slot of said gusset with its vapor axis disposed along a line substantially bisecting the angle between the axes of said branch conduits sealing the opening thereof and having an inner end extending into said main conduit and defining a curved bearing extending around a portion of the end of said flap which is adjacent said gusset, said block having spaced substantially parallel walls, the slot of said gusset being bounded by spaced parallel gusset walls disposed in sealing engagement with the spaced parallel walls of said block, pivot pin means carried by said flap and including a pin portion extending outwardly from each side thereof for pivotally supporting said flap, and a cover plate closing respective sides of said housing each having an opening for rotatably supporting a respective pin portion.

3. A conduit shunting device according to claim 2, wherein said stop valve member is of a hollow metal formation, and a block disposed within said member.

4. A conduit shunting device according to claim 2, wherein said stop valve member defines a packing around said flap between the two adjacent branch conduits.

5. A conduit shunting device according to claim 2, wherein said pivot pin means constitutes a single pivot member keyed to said flap, said flap having a curved end adjacent said stop valve member, said stop valve member having a curved recess for engaging the curved end of said flap.

References Cited
UNITED STATES PATENTS

| | | | |
|---|---|---|---|
| 765,657 | 7/1905 | Arnault | 302—28 |
| 913,400 | 2/1909 | Kimball | 137—625.44 |
| 2,767,738 | 10/1956 | Pottmeyer | 137—625.44 |

ANDRES H. NIELSEN, *Primary Examiner.*